United States Patent [19]

Tsuda et al.

[11] Patent Number: 5,804,650
[45] Date of Patent: Sep. 8, 1998

[54] AQUEOUS DISPERSION OF VINYLIDENE FLUORIDE COPOLYMER, AQUEOUS DISPERSION OF VINYLIDENE FLUORIDE SEED POLYMER AND PROCESSES FOR PREPARATION OF THE SAME

[75] Inventors: Nobuhiko Tsuda; Ryuzi Iwakiri; Yasushi Yonei; Katsuhiko Imoto; Yoshiki Shimizu; Takayuki Araki; Masahiro Kondo, all of Settsu, Japan

[73] Assignee: Daikin Industries, Ltd., Osaka, Japan

[21] Appl. No.: 776,528

[22] PCT Filed: Aug. 23, 1995

[86] PCT No.: PCT/JP95/01679

§ 371 Date: Feb. 27, 1997

§ 102(e) Date: Feb. 27, 1997

[87] PCT Pub. No.: WO96/06887

PCT Pub. Date: Mar. 7, 1996

[30] Foreign Application Priority Data

Aug. 31, 1994 [JP] Japan .................................. 6-207359

[51] Int. Cl.$^6$ ...................................................... C08L 27/12
[52] U.S. Cl. .......................... 524/805; 526/241; 526/243; 526/247; 526/248
[58] Field of Search .................................... 526/241, 243, 526/247, 248; 524/805

[56] References Cited

U.S. PATENT DOCUMENTS 5,608,022  3/1997  Nakayama et al. ...................... 526/243

FOREIGN PATENT DOCUMENTS

| 0030115 | 6/1981 | European Pat. Off. ................ 526/243 |
| 0192143 | 8/1986 | European Pat. Off. ................ 526/243 |
| 2-16326 | 4/1990 | Japan . |
| 2-132101 | 5/1990 | Japan . |
| 4-325509 | 11/1992 | Japan . |
| 2-48579 | 10/1995 | Japan . |

OTHER PUBLICATIONS

Answer 7 of 11, 1985: 114497, Showa JP83–70753, 83, 04, 20—In House Computer Searched–Abstract pp. 23–25.

Primary Examiner—Joseph L. Schofer
Assistant Examiner—N. Sarofim
Attorney, Agent, or Firm—Armstrong, Westermen, Hattori, McLeland & Naughton

[57] ABSTRACT

To provide an aqueous dispersion of a vinylidene fluoride (VdF) copolymer which can be prepared by emulsion-polymerizing VdF monomer with a reactive emulsifying agent and is excellent in stability against sedimentation because an average particle size of the copolymer is as small as not more than 200 nm and a solid content is as high as from 30 to 60% by weight; an aqueous dispersion of a VdF seed polymer which can be prepared by seed-polymerizing an ethylenically unsaturated monomer in the presence of particles obtained by emulsion-polymerizing VdF monomer with a reactive emulsifying agent and is excellent in stability against sedimentation because an average particle size of the seed polymer is as small as not more than 250 nm and a solid content is as high as from 30 to 60% by weight; and processes for preparation thereof.

8 Claims, No Drawings

AQUEOUS DISPERSION OF VINYLIDENE FLUORIDE COPOLYMER, AQUEOUS DISPERSION OF VINYLIDENE FLUORIDE SEED POLYMER AND PROCESSES FOR PREPARATION OF THE SAME

TECHNICAL FIELD

The present invention relates to an aqueous dispersion of a vinylidene fluoride copolymer, an aqueous dispersion of a vinylidene fluoride seed polymer and processes for preparation thereof. The above-mentioned aqueous dispersion of a vinylidene fluoride copolymer and aqueous dispersion of a vinylidene fluoride seed polymer are used suitably, for example, for paints for aqueous coating.

BACKGROUND ART

Hitherto fluorine-containing paints being excellent in water resistance and weather resistance have been used as paints for various buildings. However, many of the above-mentioned fluorine-containing paints are of organic solvent type, and fluorine-containing paints of aqueous type have been required from safety and environmental protection points of view. Many proposals have been made as to aqueous dispersion of a fluorine-containing polymer which is a base component of fluorine-containing paints of aqueous type and as to processes for preparation thereof.

For instance, in JP-B-33848/1986 there is described a process for preparing an aqueous dispersion of a fluorine-containing-elastomer made of vinylidene fluoride-tetrafluoroethylene-hexafluoropropylene, which has a particle size of 0.02 μm, in the presence of a fluorine-containing surfactant which has a polymerizable double bond and is represented by

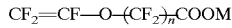

$CF_2=CF-O-(CF_2)_n-COOM$ wherein n is an integer of 1 to 7, M is an amine or an alkali metal. However, though there is obtained an aqueous dispersion containing small particles, since the content of the dispersed elastomer is not more than 25% by weight, the obtained aqueous dispersion is insufficient as one for an aqueous paint because a thickening effect by a thickener is not enough. Further there is no description as to stability of the elastomer-dispersed particles when the solid content is increased and also as to the use for an aqueous paint.

JP-B-55441/1992 discloses a process for emulsion-polymerizing an ethylenically unsaturated monomer in the presence of fluorine-containing polymer particles in an aqueous medium, and JP-A-7784/1991 discloses a process for emulsion-polymerizing an ethylenically unsaturated monomer in the presence of vinylidene fluoride copolymer particles in an aqueous medium. Those patent publications describe seed polymerization of an acrylic monomer, but there is no description therein as to controlling of size of seed particles used for seed polymerization and as to use for seed polymerization of seed particles prepared by employing a reactive emulsifying agent. When the seed particles of not more than 50 nm are used, there arise problems that since a viscosity of the obtained aqueous dispersion becomes high, the aqueous dispersion having a high solid content cannot be obtained and that coagulation occurs when the aqueous dispersion is used under high shearing force.

Also JP-B-4396/1975 discloses a process for preparing an acrylic emulsion system wherein a microemulsion having an average particle size of not more than 50 nm is prepared by copolymerizing with acrylic acid at the copolymerization and then neutralizing the produced emulsion with ammonia. In the polymerization of fluorine-containing olefin, particularly vinylidene fluoride monomer, if a non-fluorine-containing carboxylic acid monomer such as acrylic acid is present, the polymerization is inhibited remarkably. Therefore, no polymerization of a fluorine-containing olefin has been made actually in such a system.

In JP-B-17858/1974, there is disclosed a process for copolymerizing a linear saturated fluorine-containing elastic resin with a fluorine-containing vinyl compound having —COOH group on its side chain in order to introduce crosslinkable groups into the elastic resin, but there is no description as to an aqueous dispersion, controlling of particle size of particles in the aqueous dispersion and an aqueous paint.

In "Kobunshi Ronbunshu" Vol. 36, No. 11, pp. 729–737 (1979), there is disclosed that when a large amount of various surfactants is used in emulsion polymerization, particles of a polymer become smaller, and that even if a mixture of an anionic surfactant and a nonionic surfactant is used in polymerization of an acrylic monomer, the same effect as in case of using an anionic surfactant can be obtained. However if a large amount of such surfactants is used, there arises adverse effects such that when a coating film is formed with an emulsion paint, precipitation of the surfactant occurs and that water resistance of the coating film is lowered.

In JP-A-79249/1993, JP-A-85575/1993 and JP-A-255222/1993, there is disclosed that a compound of

$CF_2=CFCF_2-O-(CF(CF_3)CF_2O)_n-CF(CF_3)Y_1$

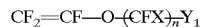

$CF_2=CF-O-(CFX)_n-Y_1$ wherein n is an integer, Y is $SO_3M$ or $COOM$ (M is an amine salt or an alkali metal), X is F or $CF_3$, or the like is copolymerized with tetrafluoroethylene, and the obtained copolymer is used as an ion-exchange membrane. In those patent publications, there is described examples of solution polymerization to obtain the ion-exchange membrane, but there is neither description of an example of emulsion polymerization in an aqueous medium nor description with respect to an aqueous paint.

An object of the present invention is to provide an aqueous dispersion of a vinylidene fluoride copolymer excellent in stability against sedimentation and having a high solid content of 30 to 60% by weight in the aqueous dispersion and a small average particle size of the copolymer of not more than 200 nm; an aqueous dispersion of a vinylidene fluoride seed polymer having a small average particle size of the seed polymer of not more than 250 nm and a high solid content of 30 to 60% by weight of the seed polymer; and processes of preparation thereof. Another object is to endow aqueous paints prepared by employing each aqueous dispersion with water resistance, weather resistance, chemical resistance and highly glossy film forming property.

DISCLOSURE OF THE INVENTION

The present invention relates to an aqueous dispersion of a vinylidene fluoride copolymer, characterized in that the dispersion has a solid content of 30 to 60% by weight and an average particle size of the copolymer of not more than 200 nm; the copolymer being prepared by copolymerizing vinylidene fluoride monomer with at least one reactive emulsifying agent selected from the group consisting of those represented by the formula (I):

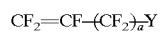

$CF_2=CF-(CF_2)_n-Y$ \hfill (I)

wherein a is an integer of 1 to 10, Y is SO$_3$M or COOM (M is H, NH$_4$ or an alkali metal), the formula (II):

  (II)

wherein X is F or CF$_3$, b is an integer of 1 to 5, Y is SO$_3$M or COOM (M is H, NH$_4$ or an alkali metal), the formula (III):

  (III)

wherein X is F or CF$_3$, c is an integer of 1 to 10, Y is SO$_3$M or COOM (M is H, NH$_4$ or an alkali metal), the formula (IV):

  (IV)

wherein X is F or CF$_3$, d is an integer of 1 to 10, Y is SO$_3$M or COOM (M is H, NH$_4$ or an alkali metal), the formula (V):

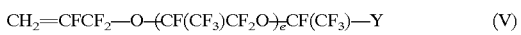  (V)

wherein e is 0 or an integer of 1 to 10, Y is SO$_3$M or COOM (M is H, NH$_4$ or an alkali metal), and the formula (VI):

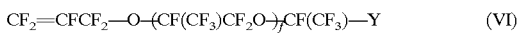  (VI)

wherein f is an integer of 1 to 10, Y is SO$_3$M or COOM (M is H, NH$_4$ or an alkali metal).

Also the present invention relates to a process for preparing an aqueous dispersion of a vinylidene fluoride copolymer, characterized in that, when preparing the aqueous dispersion of the vinylidene fluoride copolymer by emulsion-polymerizing vinylidene fluoride monomer with a reactive emulsifying agent, 0.00001 to 10% by weight, on the basis of water, of at least one reactive emulsifying agent selected from the group consisting of those represented by the formula (I):

  (I)

wherein a is an integer of 1 to 10, Y is SO$_3$M or COOM (M is H, NH$_4$ or an alkali metal), the formula (II):

  (II)

wherein X is F or CF$_3$, b is an integer of 1 to 5, Y is SO$_3$M or COOM (M is H, NH$_4$ or an alkali metal), the formula (III):

  (III)

wherein X is F or CF$_3$, c is an integer of 1 to 10, Y is SO$_3$M or COOM (M is H, NH$_4$ or an alkali metal), the formula (IV):

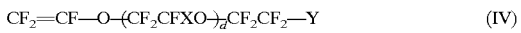  (IV)

wherein X is F or CF$_3$, d is an integer of 1 to 10, Y is SO$_3$M or COOM (M is H, NH$_4$ or an alkali metal), the formula (V):

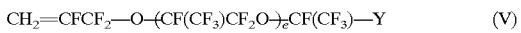  (V)

wherein e is 0 or an integer of 1 to 10, Y is SO$_3$M or COOM (M is H, NH$_4$ or an alkali metal), and the formula (VI):

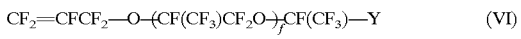  (VI)

wherein f is an integer of 1 to 10, Y is SO$_3$M or COOM (M is H, NH$_4$ or an alkali metal) is used, and that a solid content of the aqueous dispersion is adjusted to 30 to 60% by weight and an average particle size of the copolymer is adjusted to not more than 200 nm.

Further the present invention relates to an aqueous dispersion of a vinylidene fluoride seed polymer prepared by emulsion-polymerizing an ethylenically unsaturated monomer in the presence of vinylidene fluoride copolymer particles, characterized in that the vinylidene fluoride copolymer is a copolymer prepared by copolymerizing vinylidene fluoride monomer with at least one reactive emulsifying agent selected from the group consisting of those represented by the formula (I):

  (I)

wherein a is an integer of 1 to 10, Y is SO$_3$M or COOM (M is H, NH$_4$ or an alkali metal), the formula (II):

  (II)

wherein X is F or CF$_3$, b is an integer of 1 to 5, Y is SO$_3$M or COOM (M is H, NH$_4$ or an alkali metal), the formula (III):

  (III)

wherein X is F or CF$_3$, c is an integer of 1 to 10, Y is SO$_3$M or COOM (M is H, NH$_4$ or an alkali metal), the formula (IV):

  (IV)

wherein X is F or CF$_3$, d is an integer of 1 to 10, Y is SO$_3$M or COOM (M is H, NH$_4$ or an alkali metal), the formula (V):

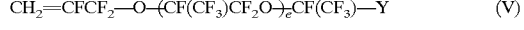  (V)

wherein e is 0 or an integer of 1 to 10, Y is SO$_3$M or COOM (M is H, NH$_4$ or an alkali metal), and the formula (VI):

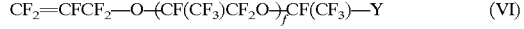  (VI)

wherein f is an integer of 1 to 10, Y is SO$_3$M or COOM (M is H, NH$_4$ or an alkali metal), and that the dispersion has a solid content of 30 to 60% by weight and an average particle size of the seed copolymer of not more than 250 nm.

Also the present invention relates to a process for preparing an aqueous dispersion of a vinylidene fluoride seed polymer, characterized in that when preparing the aqueous dispersion of the vinylidene fluoride seed polymer by emulsion-polymerizing an ethylenically unsaturated monomer in the presence of vinylidene fluoride copolymer particles, the vinylidene fluoride copolymer is prepared through emulsion polymerization of vinylidene fluoride monomer with 0.00001 to 10% by weight, on the basis of water, of at least one reactive emulsifying agent selected from the group consisting of those represented by the formula (I):

  (I)

wherein a is an integer of 1 to 10, Y is SO$_3$M or COOM (M is H, NH$_4$ or an alkali metal), the formula (II):

  (II)

wherein X is F or CF$_3$, b is an integer of 1 to 5, Y is SO$_3$M or COOM (M is H, NH$_4$ or an alkali metal), the formula (III):

  (III)

wherein X is F or CF$_3$, c is an integer of 1 to 10, Y is SO$_3$M or COOM (M is H, NH$_4$ or an alkali metal), the formula (IV):

  (IV)

wherein X is F or CF$_3$, d is an integer of 1 to 10, Y is SO$_3$M or COOM (M is H, NH$_4$ or an alkali metal), the formula (V):

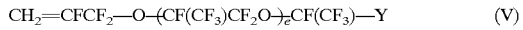  (V)

wherein e is 0 or an integer of 1 to 10, Y is SO$_3$M or COOM (M is H, NH$_4$ or an alkali metal), and the formula (VI):

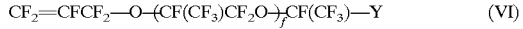  (VI)

wherein f is an integer of 1 to 10, Y is SO$_3$M or COOM (M is H, NH$_4$ or an alkali metal), and that a solid content of the aqueous dispersion of the seed polymer and an average particle size of the seed polymer are adjusted to 30 to 60% by weight and not more than 250 nm.

BEST MODE FOR CARRYING OUT THE INVENTION

The aqueous dispersion of the vinylidene fluoride copolymer of the present invention is an aqueous dispersion of a vinylidene fluoride (VdF) copolymer obtained from VdF monomer and a reactive emulsifying agent.

The above-mentioned reactive emulsifying agent is a fluorine-containing compound having a polymerizable double bond and a hydrophilic group in its molecule, and is at least one compound selected from the group consisting of those represented by the formula (I):

  (I)

wherein a is an integer of 1 to 10, Y is SO$_3$M or COOM (M is H, NH$_4$ or an alkali metal), the formula (II):

  (II)

wherein X is F or CF$_3$, b is an integer of 1 to 5, Y is SO$_3$M or COOM (M is H, NH$_4$ or an alkali metal), the formula (III):

  (III)

wherein X is F or CF$_3$, c is an integer of 1 to 10, Y is SO$_3$M or COOM (M is H, NH$_4$ or an alkali metal), the formula (IV):

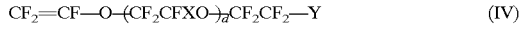  (IV)

wherein X is F or CF$_3$, d is an integer of 1 to 10, Y is SO$_3$M or COOM (M is H, NH$_4$ or an alkali metal), the formula (V):

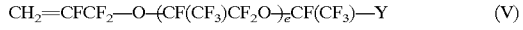  (V)

wherein e is 0 or an integer of 1 to 10, Y is SO$_3$M or COOM (M is H, NH$_4$ or an alkali metal), and the formula (VI):

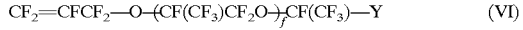  (VI)

wherein f is an integer of 1 to 10, Y is SO$_3$M or COOM (M is H, NH$_4$ or an alkali metal).

In the above-mentioned formula (I), it is preferable that a is an integer of 1 to 5 from the viewpoint of surface activating ability of the reactive emulsifying agent, that Y is COOM from the viewpoint of stability of the compound and that M is H or NH$_4$ from the viewpoint of water resistance of a coating film.

Examples of the compound represented by the above-mentioned formula (I) are, for instance, CF$_2$=CF—CF$_2$—COONH$_4$, CF$_2$=CF—CF$_2$—COOH, CF$_2$=CF—CF$_2$CF$_2$COOH, CF$_2$=CF—CF$_2$—COONa, CF$_2$=CF—CF$_2$—SO$_3$NH$_4$, CF$_2$=CF—CF$_2$—SO$_3$H, CF$_2$=CF—CF$_2$CF$_2$SO$_3$H, CF$_2$=CF—CF$_2$CF$_2$SO$_3$Na and the like. CF$_2$=CFCF$_2$COONH$_4$ is preferable from the viewpoint that an aqueous dispersion of a VdF copolymer having a small particle size can be obtained at a high concentration.

In the above-mentioned formula (II), it is preferable that X is CF$_3$ from the viewpoint of stability of the compound, that b is an integer of 1 to 3 from the viewpoint of surface activating ability of the reactive emulsifying agent, that Y is COOM or SO$_3$M from the viewpoint of stability of the compound and that M is H or NH$_4$ from the viewpoint of water resistance of a coating film.

Examples of the compound represented by the above-mentioned formula (II) are, for instance,

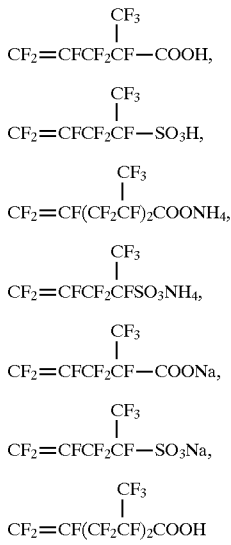

and the like. From the viewpoint that an aqueous dispersion of a VdF copolymer having a small particle size can be obtained,

is preferable.

In the above-mentioned formula (III), it is preferable that X is F or CF$_3$ from the viewpoint of stability of the compound and weather resistance, that c is an integer of 1 to 5 from the viewpoint of surface activating ability of the reactive emulsifying agent, that Y is COOM or SO$_3$M from the viewpoint of stability of the compound and that M is H or NH$_4$ from the viewpoint of water resistance of a coating film.

Examples of the compound represented by the above-mentioned formula (III) are, for instance, CF$_2$=CF—OCF$_2$CF$_2$CF$_2$COOH, CF$_2$=CF—OCF$_2$CF$_2$COONH$_4$, CF$_2$=CF—OCF$_2$COOH and the like. CF$_2$=CF—OCF$_2$CF$_2$CF$_2$COOH is preferable from the viewpoint that an aqueous dispersion of a VdF copolymer having a small particle size can be obtained.

In the above-mentioned formula (IV), it is preferable that X is F or CF$_3$ from the viewpoint of stability of the compound and weather resistance, that d is an integer of 1 to 5 from the viewpoint of surface activating ability of the reactive emulsifying agent, that Y is COOM or $SO_3M$ from the viewpoint of stability of the compound and that M is H or $NH_4$ from the viewpoint of water resistance of a coating film.

Examples of the compound represented by the above-mentioned formula (IV) are, for instance, $CF_2=CF-O-CF_2CF(CF_3)-OCF_2CF_2-COOH$, $CF_2=CF-O-CF_2CF(CF_3)-OCF_2CF_2-COONH_4$, $CF_2=CF-O-CF_2CF(CF_3)-OCF_2CF_2SO_3H$, $CF_2=CF-O-CF_2CF(CF_3)-OCF_2CF_2SO_3NH_4$, an ammonium salt thereof, and the like. From the viewpoint that an aqueous dispersion of a VdF copolymer having a small particle size can be obtained, $CF_2=CF-O-CF_2CF(CF_3)-OCF_2CF_2-COOH$ and $CF_2=CF-O-CF_2CF(CF_3)-OCF_2CF_2-SO_3H$ are preferable.

In the above-mentioned formula (V), it is preferable that e is an integer of 1 to 5 from the viewpoint of surface activating ability of the reactive emulsifying agent, that Y is COOM from the viewpoint of stability of the compound and that M is Na or $NH_4$ from the viewpoint of water resistance of a coating film.

Examples of the compound represented by the above-mentioned formula (V) are, for instance,

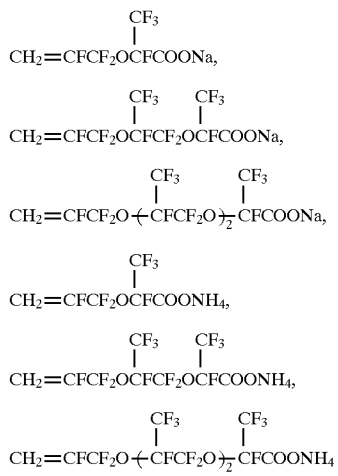

and the like. From the viewpoint that an aqueous dispersion of a VdF copolymer having a small particle size can be obtained, $CH_2=CFCF_2OCF(CF_3)COONH_4$ and $CH_2=CFCF_2OCF(CF_3)CF_2OCF(CF_3)COONH_4$ are preferable.

In the above-mentioned formula (VI), it is preferable that f is an integer of 1 to 5 from the viewpoint of surface activating ability of the reactive emulsifying agent, that Y is COOM from the viewpoint of stability of the compound and that M is H or $NH_4$ from the viewpoint of water resistance of a coating film.

Examples of the compound represented by the above-mentioned formula (VI) are, for instance,

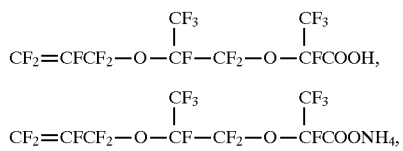
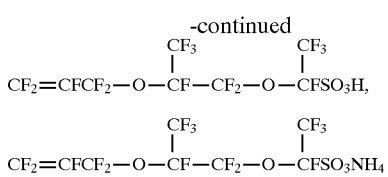

and the like. From the viewpoint that an aqueous dispersion of a VdF copolymer having a small particle size can be obtained,

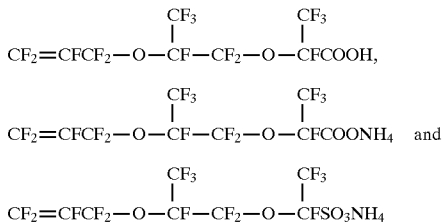

are preferable.

In the present invention, the above-mentioned VdF copolymer may be a copolymer comprising the above-mentioned VdF monomer and reactive emulsifying agent and in addition thereto, other fluorine-containing monomer. Examples of the other fluorine-containing monomer are, for instance, tetrafluoroethylene (TFE), trifluoroethylene (TrFE), chlorotrifluoroethylene (CTFE), hexafluoropropylene (HFP), vinyl fluoride (VF) and the like. From the viewpoint of copolymerizability of the VdF monomer, TFE, HFP and CTFE are preferable.

In the above-mentioned VdF copolymer, examples of combination of VdF, other fluorine-containing monomer and reactive emulsifying agent are, for instance, combinations of any of VdF/TFE, VdF/TFE/HFP, VdF/TFE/CTFE, VdF/TFE/TrFE, VdF/CTFE, VdF/HFP, VdF/TFE/HFP/CTFE or the like with any of $CF_2=CFCF_2COONH_4$, $CH_2=CFCF_2OCF(CF_3)CF_2OCF(CF_3)COONH_4$, $CH_2=CFCF_2OCF(CF_3)COONH_4$ or the like. From the viewpoint of hardness of a coating film in case of the use for coating, the combination of VdF/TFE/CTFE with $CH_2=CFCF_2OCF(CF_3)CF_2OCF(CF_3)COONH_4$ is preferable.

A copolymerization ratio of VdF with the other fluorine-containing monomer in the above-mentioned VdF copolymer is from 60/40 to 95/5% by weight, preferably 70/30 to 95/5% by weight. When VdF is less than 60% by weight, there is a tendency that compatibility of the VdF polymer with an acrylic polymer, which is a characteristic of the VdF polymer, is lowered. When more than 95% by weight, since solubility of the seed particles to an acrylic ester and/or methacrylic acid ester is poor, there is a tendency that swelling of seed particles with the monomer does not advance rapidly at seed polymerization, a cast film prepared from the obtained emulsion has poor transparency and a gloss of the coating film from a paint cannot be obtained.

The above-mentioned reactive emulsifying agent may be contained in an amount of from 0.001 to 0.1% by mole in the above-mentioned monomer combination.

An average particle size of the above-mentioned VdF copolymer is not more than 200 nm, preferably from 10 to 200 nm, more preferably from 50 to 150 nm. When the average particle size is less than 10 nm, there is a tendency that shape of the VdF copolymer is difficult to become spherical and film forming property is lowered. When more than 200 nm, storage stability, mechanical stability and chemical stability of the aqueous dispersion of the VdF copolymer tend to be lowered.

A solid content of the above-mentioned aqueous dispersion of the VdF copolymer is from 30 to 60% (% by weight, hereinafter the same), preferably from 35 to 55%, more preferably from 35 to 50%. When the solid content is less than 30%, there is a tendency that adjusting of viscosity is difficult when making a paint and that drying of the paint is slow. When more than 60%, stability of the dispersion is lowered.

To the aqueous dispersion of the VdF copolymer of the present invention may be added a known fluorine-containing surfactant.

The known fluorine-containing surfactant is one or a mixture of compounds having surface activating ability and containing fluorine atom in the structure. For example, there are an acid represented by $X(CF_2)_nCOOH$ (X is F or H, n is an integer of 6 to 20), its alkali metal salt, ammonium salt, amine salt or quaternary ammonium salt; an acid represented by $Y(CH_2CF_2)_mCOOH$ (Y is F or Cl, m is an integer of 6 to 13), its alkali metal salt, ammonium salt, amine salt or quaternary ammonium salt; and the like. From weather resistance and water resistance points of view, ammonium salt of perfluorooctanoic acid and ammonium salt of perfluorononanoic acid are preferable.

An amount of the above-mentioned fluorine-containing surfactant is not more than 1.0%, preferably not more than 0.5%, more preferably not more than 0.2% on the basis of water. When the amount of the fluorine-containing surfactant is more than 1.0%, it is not preferable because there is a tendency that when forming a film by using an aqueous dispersion, the fluorine-containing surfactant precipitates in the film and water absorption increases to make the dispersion turbid in white.

The aqueous dispersion of the VdF copolymer of the present invention is one in which the VdF copolymer is dispersed in water. To the aqueous dispersion can be added a hydrophilic organic solvent.

To the aqueous dispersion of the VdF copolymer of the present invention can be added various additives to make an aqueous paint. By adding additives which are used generally for aqueous paints, for example, a pigment, thickener, dispersing agent, defoaming agent, anti-freezing agent, auxiliary for film formation and the like, the resulting aqueous dispersion can be used as paints for exterior of buildings and as paints for structures of construction.

Further the present invention relates to a process for preparing an aqueous dispersion of a VdF copolymer by emulsion polymerization of VdF monomer and a reactive emulsifying agent.

The above-mentioned reactive emulsifying agent is a fluorine-containing compound having a polymerizable double bond and a hydrophilic group in its molecule, and is at least one compound selected from the group consisting of those represented by the formula (I):

  (I)

wherein a is an integer of 1 to 10, Y is $SO_3M$ or COOM (M is H, $NH_4$ or an alkali metal), the formula (II):

  (II)

wherein X is F or $CF_3$, b is an integer of 1 to 5, Y is $SO_3M$ or COOM (M is H, $NH_4$ or an alkali metal), the formula (III):

  (III)

wherein X is F or $CF_3$, c is an integer of 1 to 10, Y is $SO_3M$ or COOM (M is H, $NH_4$ or an alkali metal), the formula (IV):

  (IV)

wherein X is F or $CF_3$, d is an integer of 1 to 10, Y is $SO_3M$ or COOM (M is H, $NH_4$ or an alkali metal), the formula (V):

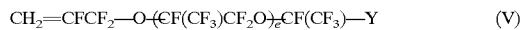  (V)

wherein e is 0 or an integer of 1 to 10, Y is $SO_3M$ or COOM (M is H, $NH_4$ or an alkali metal), and the formula (VI):

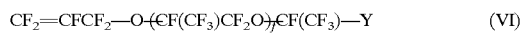  (VI)

wherein f is an integer of 1 to 10, Y is $SO_3M$ or COOM (M is H, $NH_4$ or an alkali metal).

In the above-mentioned formula (I), it is preferable that a is an integer of 1 to 5 from the viewpoint of surface activating ability of the reactive emulsifying agent, that Y is COOM from the viewpoint of stability of the compound and that M is H or $NH_4$ from the viewpoint of water resistance of a coating film.

Examples of the compound represented by the above-mentioned formula (I) are, for instance, $CF_2=CF-CF_2-COONH_4$, $CF_2=CF-CF_2-COOH$, $CF_2=CF-CF_2CF_2COOH$, $CF_2=CF-CF_2-COONa$, $CF_2=CF-CF_2-SO_3NH_4$, $CF_2=CF-CF_2-SO_3H$, $CF_2=CF-CF_2CF_2SO_3H$, $CF_2=CF-CF_2CF_2SO_3Na$ and the like. $CF_2=CFCF_2COONH_4$ is preferable from the viewpoint that an aqueous dispersion of a VdF copolymer having a small particle size can be obtained at a high concentration.

In the above-mentioned formula (II), it is preferable that X is $CF_3$ from the viewpoint of stability of the compound, that b is an integer of 1 to 3 from the viewpoint of surface activating ability of the reactive emulsifying agent, that Y is COOM or $SO_3M$ from the viewpoint of stability of the compound and that M is H or $NH_4$ from the viewpoint of water resistance of a coating film.

Examples of the compound represented by the above-mentioned formula (II) are, for instance,

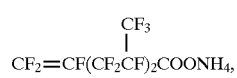

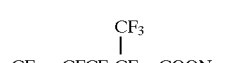

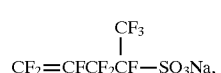

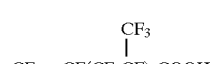

and the like. From the viewpoint that an aqueous dispersion of a VdF copolymer having a small particle size can be obtained, $$CF_2=CF(CF_2CF)_2COOH \quad \overset{CF_3}{|}$$

is preferable.

In the above-mentioned formula (III), it is preferable that X is F or $CF_3$ from the viewpoint of stability of the compound and weather resistance, that c is an integer of 1 to 5 from the veiwpoint of surface activating ability of the reactive emulsifying agent, that Y is COOM or $SO_3M$ from the viewpoint of stability of the compound and that M is H or $NH_4$ from the viewpoint of water resistance of a coating film.

Examples of the compound represented by the above-mentioned formula (III) are, for instance, $CF_2=CF-OCF_2CF_2CF_2COOH$, $CF_2=CF-OCF_2CF_2COONH_4$, $CF_2=CF-OCF_2COOH$ and the like. $CF_2=CF-OCF_2CF_2CF_2COOH$ is preferable from the viewpoint that an aqueous dispersion of a VdF copolymer having a small particle size can be obtained.

In the above-mentioned formula (IV), it is preferable that X is F or $CF_3$ from the viewpoint of stability of the compound and weather resistance, that d is an integer of 1 to 5 from the viewpoint of surface activating ability of the reactive emulsifying agent, that Y is COOM or $SO_3M$ from the viewpoint of stability of the compound and that M is H or $NH_4$ from the viewpoint of water resistance of a coating film.

Examples of the compound represented by the above-mentioned formula (IV) are, for instance, $CF_2=CF-O-CF_2CF(CF_3)-OCF_2CF_2-COOH$, $CF_2=CF-O-CF_2CF(CF_3)-OCF_2CF_2-COONH_4$, $CF_2=CF-O-CF_2CF(CF_3)-OCF_2CF_2SO_3H$, $CF_2=CF-O-CF_2CF(CF_3)-OCF_2CF_2SO_3NH_4$ and the like. From the viewpoint that an aqueous dispersion of a VdF copolymer having a small particle size can be obtained, $CF_2=CF-O-CF_2CF(CF_3)-OCF_2CF_2-COOH$ and $CF_2=CF-O-CF_2CF(CF_3)-OCF_2CF_2-SO_3H$ are preferable.

In the above-mentioned formula (V), it is preferable that e is an integer of 1 to 5 from the viewpoint of surface activating ability of the reactive emulsifying agent, that Y is COOM from the viewpoint of stability of the compound and that M is Na or $NH_4$ from the viewpoint of water resistance of a coating film.

Examples of the compound represented by the above-mentioned formula (V) are, for instance,

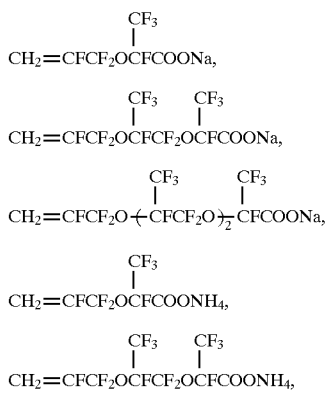

and the like. From the viewpoint that an aqueous dispersion of a VdF copolymer having a small particle size can be obtained, $CH_2=CFCF_2OCF(CF_3)COONH_4$ and $CH_2=CFCF_2OCF(CF_3)CF_2OCF(CF_3)COONH_4$ are preferable.

In the above-mentioned formula (VI), it is preferable that f is an integer of 1 to 5 from the viewpoint of surface activating ability of the reactive emulsifying agent, that Y is COOM from the viewpoint of stability of the compound and that M is H or $NH_4$ from the viewpoint of water resistance of a coating film.

Examples of the compound represented by the above-mentioned formula (VI) are, for instance,

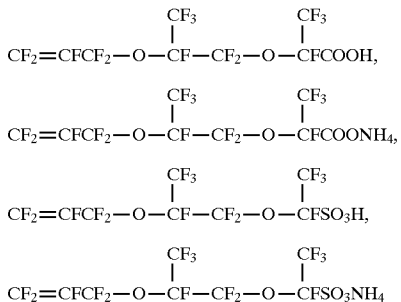

and the like. From the viewpoint that an aqueous dispersion of a VdF copolymer having a small particle size can be obtained,

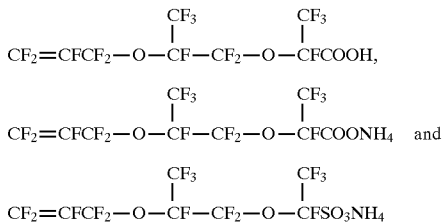

are preferable.

When emulsion-polymerizing the above-mentioned VdF monomer and reactive emulsifying agent, it is possible to add a fluorine-containing monomer other than VdF, for example, tetrafluoroethylene (TFE), trifluoroethylene (TrFE), chlorotrifluoroethylene (CTFE), hexafluoropropylene (HFP), vinyl fluoride (VF) and the like. From the viewpoint of copolymerizability of the VdF monomer, TFE, HFP and CTFE are preferable.

For the above-mentioned emulsion polymerization, it is possible to use a known fluorine-containing surfactant.

The known fluorine-containing surfactant is one or a mixture of compounds having surface activating ability and containing fluorine atom in the structure. For example, there are an acid represented by $X(CF_2)_nCOOH$ (X is F or H, n is an integer of 6 to 20), its alkali metal salt, ammonium salt, amine salt or quaternary ammonium salt; an acid represented by $Y(CH_2CF_2)_mCOOH$ (Y is F or Cl, m is an integer of 6 to 13), its alkali metal salt, ammonium salt, amine salt or quaternary ammonium salt; and the like. From weather resistance and water resistance points of view, ammonium salt of perfluorooctanoic acid and ammonium salt of perfluorononanoic acid are preferable.

An amount of the above-mentioned fluorine-containing surfactant is not more than 1.0%, preferably not more than 0.5%, more preferably not more than 0.2% on the basis of water. When the amount of the fluorine-containing surfactant is more than 1.0%, it is not preferable because there is a tendency that when forming a film by using an aqueous dispersion, the fluorine-containing surfactant precipitates in the film and water absorption increases to make the dispersion turbid in white.

In order to prepare the above-mentioned aqueous dispersion of the VdF copolymer, a reactor is charged with water as a polymerization solvent and the above-mentioned reactive emulsifying agent in an amount of 0.00001 to 10%, preferably 0.0001 to 1.0%, more preferably 0.001 to 0.5% on the basis of the polymerization medium, and then pressure feeding of nitrogen gas and deaeration are repeated to remove dissolved air.

When the amount of the above-mentioned reactive emulsifying agent charged is less than 0.00001%, there is a tendency that large particles having insufficient stability against sedimentation are obtained. When more than 10%, there is a tendency that shape of the particles does not become spherical and film forming property when drying the aqueous dispersion is lowered.

Then the above-mentioned VdF monomer alone or a monomer mixture comprising the VdF monomer and the other fluorine-containing monomer is fed into the reactor under pressure to be a pressure of 1.0 to 50 kgf/cm².

In that case, a mixing ratio of the other fluorine-containing monomer may be from 0 to 30% by mole.

Then as a polymerization initiator, for example, a persulfate such as ammonium persulfate, hydrogen peroxide, di-isopropyl peroxydicarbonate or azobisisobutyronitrile is introduced in an amount of 0.005 to 1.0%, preferably 0.01 to 0.5% on the basis of water. When the amount of the polymerization initiator is less than 0.005%, polymerization speed tends to be extremely slow. When more than 1.0%, electrolyte content tends to increase to make particle size large.

Further the above-mentioned VdF monomer or monomer mixture is fed continuously so that the pressure in the reactor becomes constant in the range of from 1.0 to 50 kgf/cm².

Polymerization is carried out for 5 to 100 hours under the conditions mentioned above.

After that, the inside conditions of the reactor are returned to normal temperature and normal pressure and then the polymerization is terminated to give an aqueous dispersion of the VdF copolymer.

An average particle size of the VdF copolymer of the aqueous dispersion obtained by the above-mentioned process can be controlled within not more than 200 nm. The average particle size can be controlled by the charging amount of the reactive emulsifying agent.

Also the solid content of the aqueous dispersion of the VdF copolymer which is prepared by the above-mentioned process can be controlled within 30 to 60%. The solid content can be controlled by blowing the VdF monomer or the monomer mixture out from the reactor at the time when a given amount thereof has been fed continuously, and then stopping stirring to terminate the reaction.

Further the aqueous dispersion of the VdF seed polymer of the present invention is an aqueous dispersion of the VdF seed polymer which is obtained by emulsion-polymerizing an ethylenically unsaturated monomer in the presence of VdF copolymer particles. The VdF copolymer is a copolymer of VdF monomer and a reactive emulsifying agent.

The above-mentioned reactive emulsifying agent is a fluorine-containing compound having a polymerizable double bond and a hydrophilic group in its molecule, and is at least one compound selected from the group consisting of those represented by the formula (I):

wherein a is an integer of 1 to 10, Y is $SO_3M$ or COOM (M is H, $NH_4$ or an alkali metal), the formula (II):

wherein X is F or $CF_3$, b is an integer of 1 to 5, Y is $SO_3M$ or COOM (M is H, $NH_4$ or an alkali metal), the formula (III):

wherein X is F or $CF_3$, c is an integer of 1 to 10, Y is $SO_3M$ or COOM (M is H, $NH_4$ or an alkali metal), the formula (IV):

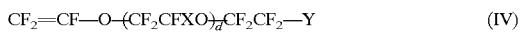

wherein X is F or $CF_3$, d is an integer of 1 to 10, Y is $SO_3M$ or COOM (M is H, $NH_4$ or an alkali metal), the formula (V):

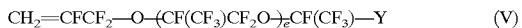

wherein e is 0 or an integer of 1 to 10, Y is $SO_3M$ or COOM (M is H, $NH_4$ or an alkali metal), and the formula (VI):

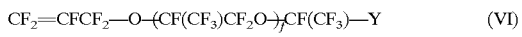

wherein f is an integer of 1 to 10, Y is $SO_3M$ or COOM (M is H, $NH_4$ or an alkali metal).

In the above-mentioned formula (I), it is preferable that a is an integer of 1 to 5 from the viewpoint of surface activating ability of the reactive emulsifying agent, that Y is COOM from the viewpoint of stability of the compound and that M is H or $NH_4$ from the viewpoint of water resistance of a coating film.

Examples of the compound represented by the above-mentioned formula (I) are, for instance, $CF_2=CF-CF_2-COONH_4$, $CF_2=CF-CF_2-COOH$, $CF_2=CF-CF_2CF_2COOH$, $CF_2=CF-CF_2-COONa$, $CF_2=CF-CF_2-SO_3NH_4$, $CF_2=CF-CF_2-SO_3H$, $CF_2=CF-CF_2CF_2SO_3H$, $CF_2=CF-CF_2CF_2SO_3Na$ and the like. $CF_2=CFCF_2COONH_4$ is preferable from the viewpoint that an aqueous dispersion of a VdF copolymer having a small particle size can be obtained at a high concentration.

In the above-mentioned formula (II), it is preferable that X is $CF_3$ from the viewpoint of stability of the compound, that b is an integer of 1 to 3 from the viewpoint of surface activating ability of the reactive emulsifying agent, that Y is COOM or $SO_3M$ from the viewpoint of stability of the compound and that M is H or $NH_4$ from the viewpoint of water resistance of a coating film.

Examples of the compound represented by the above-mentioned formula (II) are, for instance,

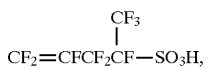

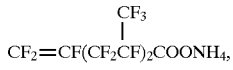

-continued $$CF_2=CFCF_2CFSO_3NH_4,$$
$$\overset{CF_3}{\underset{|}{}}$$

$$CF_2=CFCF_2CF—COONa,$$
$$\overset{CF_3}{\underset{|}{}}$$

$$CF_2=CFCF_2CF—SO_3Na,$$
$$\overset{CF_3}{\underset{|}{}}$$

$$CF_2=CF(CF_2CF)_2COOH$$
$$\overset{CF_3}{\underset{|}{}}$$

and the like. From the viewpoint that an aqueous dispersion of a VdF copolymer having a small particle size can be obtained, $$CF_2=CF(CF_2CF)_2COOH$$
$$\overset{CF_3}{\underset{|}{}}$$

is preferable.

In the above-mentioned formula (III), it is preferable that X is F or $CF_3$ from the viewpoint of stability of the compound and weather resistance, that c is an integer of 1 to 5 from the viewpoint of surface activating ability of the reactive emulsifying agent, that Y is COOM or $SO_3M$ from the viewpoint of stability of the compound and that M is H or $NH_4$ from the viewpoint of water resistance of a coating film.

Examples of the compound represented by the above-mentioned formula (III) are, for instance, $CF_2=CF—OCF_2CF_2CF_2COOH$, $CF_2=CF—OCF_2CF_2COONH_4$, $CF_2=CF—OCF_2COOH$ and the like. $CF_2=CF—OCF_2CF_2CF_2COOH$ is preferable from the viewpoint that an aqueous dispersion of a VdF copolymer having a small particle size can be obtained.

In the above-mentioned formula (IV), it is preferable that X is F or $CF_3$ from the viewpoint of stability of the compound and weather resistance, that d is an integer of 1 to 5 from the viewpoint of surface activating ability of the reactive emulsifying agent, that Y is COOM or $SO_3M$ from the viewpoint of stability of the compound and that M is H or $NH_4$ from the viewpoint of water resistance of a coating film.

Examples of the compound represented by the above-mentioned formula (IV) are, for instance, $CF_2=CF—O—CF_2CF(CF_3)—OCF_2CF_2—COOH$, $CF_2=CF—O—CF_2CF(CF_3)—OCF_2CF_2—COONH_4$, $CF_2=CF—O—CF_2CF(CF_3)—OCF_2CF_2SO_3H$, $CF_2=CF—O—CF_2CF(CF_3)—OCF_2CF_2SO_3NH_4$ and the like. From the viewpoint that an aqueous dispersion of a VdF copolymer having a small particle size can be obtained, $CF_2=CF—O—CF_2CF(CF_3)—OCF_2CF_2—COOH$ and $CF_2=CF—O—CF_2CF(CF_3)—OCF_2CF_2—SO_3H$ are preferable.

In the above-mentioned formula (V), it is preferable that e is an integer of 1 to 5 from the viewpoint of surface activating ability of the reactive emulsifying agent, that Y is COOM from the viewpoint of stability of the compound and that M is Na or $NH_4$ from the viewpoint of water resistance of a coating film.

Examples of the compound represented by the above-mentioned formula (V) are, for instance, $$CH_2=CFCF_2OCFCOONa,$$
$$\overset{CF_3}{\underset{|}{}}$$

$$CH_2=CFCF_2OCFCF_2OCFCOONa,$$
$$\overset{CF_3}{\underset{|}{}}\quad\overset{CF_3}{\underset{|}{}}$$

$$CH_2=CFCF_2O(CFCF_2O)_2CFCOONa,$$
$$\overset{CF_3}{\underset{|}{}}\quad\overset{CF_3}{\underset{|}{}}$$

$$CH_2=CFCF_2OCFCOONH_4,$$
$$\overset{CF_3}{\underset{|}{}}$$

$$CH_2=CFCF_2OCFCF_2OCFCOONH_4,$$
$$\overset{CF_3}{\underset{|}{}}\quad\overset{CF_3}{\underset{|}{}}$$

$$CH_2=CFCF_2O(CFCF_2O)_2CFCOONH_4$$
$$\overset{CF_3}{\underset{|}{}}\quad\overset{CF_3}{\underset{|}{}}$$

and the like. From the viewpoint that an aqueous dispersion of a VdF copolymer having a small particle size can be obtained, $CH_2=CFCF_2OCF(CF_3)COONH_4$ and $CH_2=CFCF_2OCF(CF_3)CF_2OCF(CF_3)COONH_4$ are preferable.

In the above-mentioned formula (VI), it is preferable that f is an integer of 1 to 5 from the viewpoint of surface activating ability of the reactive emulsifying agent, that Y is COOM from the viewpoint of stability of the compound and that M is H or $NH_4$ from the viewpoint of water resistance of a coating film.

Examples of the compound represented by the above-mentioned formula (VI) are, for instance, $$CF_2=CFCF_2—O—CF—CF_2—O—CFCOOH,$$
$$\overset{CF_3}{\underset{|}{}}\quad\overset{CF_3}{\underset{|}{}}$$

$$CF_2=CFCF_2—O—CF—CF_2—O—CFCOONH_4,$$
$$\overset{CF_3}{\underset{|}{}}\quad\overset{CF_3}{\underset{|}{}}$$

$$CF_2=CFCF_2—O—CF—CF_2—O—CFSO_3H,$$
$$\overset{CF_3}{\underset{|}{}}\quad\overset{CF_3}{\underset{|}{}}$$

$$CF_2=CFCF_2—O—CF—CF_2—O—CFSO_3NH_4$$
$$\overset{CF_3}{\underset{|}{}}\quad\overset{CF_3}{\underset{|}{}}$$

and the like. From the viewpoint that an aqueous dispersion of a VdF copolymer having a small particle size can be obtained, $$CF_2=CFCF_2—O—CF—CF_2—O—CFCOOH,$$
$$\overset{CF_3}{\underset{|}{}}\quad\overset{CF_3}{\underset{|}{}}$$

$$CF_2=CFCF_2—O—CF—CF_2—O—CFCOONH_4 \text{ and}$$
$$\overset{CF_3}{\underset{|}{}}\quad\overset{CF_3}{\underset{|}{}}$$

$$CF_2=CFCF_2—O—CF—CF_2—O—CFSO_3NH_4$$
$$\overset{CF_3}{\underset{|}{}}\quad\overset{CF_3}{\underset{|}{}}$$

are preferable.

The VdF seed polymer in the present invention is a seed polymer of an ethylenically unsaturated monomer, which is prepared by using, as seeds, the above-mentioned VdF copolymer particles. As the ethylenically unsaturated monomer, there are, for example, a monomer having functional group and a vinyl compound. Examples of the monomer having functional group are, for instance, an unsaturated carboxylic acid such as acrylic acid, methacrylic acid, maleic acid or crotonic acid; an acrylic ester such as methyl acrylate; a methacrylic acid ester such as methyl methacrylate (MMA); an amide compound such as acrylamide, methacrylamide, N-methylacrylamide, N-methylolacrylamide, N-butoxymethylacrylamide, N-methylolmethacrylamide, N-methylmethacrylamide or N-butoxymethylmethacrylamide; a hydroxyl-containing monomer such as hydroxyethyl acrylate, hydroxyethyl methacrylate, hydroxypropyl acrylate or hydroxypropyl methacrylate; an epoxy-containing monomer such as glycidyl acrylate or glycidyl methacrylate; a silanol-containing monomer such as γ-trimethoxysilane methacrylate, or γ-triethoxysilane methacrylate; an aldehyde-containing monomer such as acrolein; and the like. Examples of the vinyl compound are, for instance, styrene (St), acrylonitrile and the like. From the viewpoint of compatibility with the VdF copolymer, an acrylic ester and/or a methacrylic acid ester are preferable.

The VdF copolymer as the seed in the above-mentioned VdF seed polymer may be a copolymer comprising the above-mentioned VdF, reactive emulsifying agent and other fluorine-containing monomer. Examples of the other fluorine-containing monomer are, for instance, tetrafluoroethylene (TFE), trifluoroethylene (TrFE), chlorotrifluoroethylene (CTFE), hexafluoropropylene (HFP), vinyl fluoride (VF) and the like. From the viewpoint of copolymerizability of the VdF monomer, TFE, HFP and CTFE are preferable.

In the above-mentioned VdF copolymer, examples of combination of VdF, other fluorine-containing monomer and reactive emulsifying agent are, for instance, combinations of any of VdF/TFE, VdF/TFE/HFP, VdF/TFE/CTFE, VdF/TFE/TrFE, VdF/CTFE, VdF/HFP, VdF/TFE/HFP/CTFE or the like with any of $CF_2\!=\!CFCF_2COONH_4$, $CH_2\!=\!CFCF_2OCF(CF_3)CF_2OCF(CF_3)COONH_4$, $CH_2\!=\!CFCF_2OCF(CF_3)COONH_4$ or the like. From the viewpoint of compatibility with an acrylic resin, the combination of VdF/TFE/CTFE with $CH_2\!=\!CFCF_2OCF(CF_3)CF_2OCF(CF_3)COONH_4$ is preferable.

A copolymerization ratio of VdF with the other fluorine-containing monomer in the above-mentioned VdF copolymer is from 60/40 to 95/5%, preferably 70/30 to 95/5%. When VdF is less than 60%, there is a tendency that compatibility of the VdF polymer with an acrylic polymer, which is a characteristic of the VdF polymer, is lowered. When more than 95%, since solubility of the seed particles to an acrylic ester and/or methacrylic acid ester is poor, there is a tendency that swelling of seed particles with the monomer does not advance rapidly at seed polymerization, a cast film prepared from the obtained emulsion has poor transparency and a gloss of the coating film from a paint cannot be obtained.

The above-mentioned reactive emulsifying agent may be contained in an amount of from 0.001 to 0.1% by mole in the above-mentioned monomer combination.

The above-mentioned VdF seed polymer is one prepared by polymerizing 20 to 100 parts by weight of the ethylenically unsaturated monomer in the presence of 100 parts by weight of the VdF copolymer as the seed.

An average particle size of the above-mentioned VdF seed polymer is not more than 250 nm, preferably from 50 to 250 nm, more preferably from 100 to 160 nm. When the average particle size is less than 50 nm, there is a tendency that a viscosity of the aqueous dispersion increases and the aqueous dispersion having a high concentration cannot be obtained. When more than 250 nm, sedimentation and coagulation of particles occur during the storage of the aqueous dispersion and further when forming a film, gloss tends not to be obtained.

A content of the VdF seed polymer of the above-mentioned dispersion of the VdF seed polymer is from 30 to 60%, preferably from 35 to 55%, more preferably from 35 to 50%. When the content is less than 30%, there is a tendency that adjusting of viscosity is difficult when making a paint and that drying of the paint is slow. When more than 60%, stability of the dispersion is lowered.

To the aqueous dispersion of the VdF seed polymer of the present invention may be added a known fluorine-containing surfactant.

The known fluorine-containing surfactant is one or a mixture of compounds having surface activating ability and containing fluorine atom in the structure. For example, there are an acid represented by $X(CF_2)_n COOH$ (X is F or H, n is an integer of 6 to 20), its alkali metal salt, ammonium salt, amine salt or quaternary ammonium salt; an acid represented by $Y(CH_2CF_2)_m COOH$ (Y is F or Cl, m is an integer of 6 to 13), its alkali metal salt, ammonium salt, amine salt or quaternary ammonium salt; and the like. From weather resistance and water resistance points of view, ammonium salt of perfluorooctanoic acid and ammonium salt of perfluorononanoic acid are preferable.

An amount of the above-mentioned fluorine-containing surfactant is not more than 1.0%, preferably not more than 0.5%, more preferably not more than 0.2% on the basis of water. When the amount of the fluorine-containing surfactant is more than 1.0%, it is not preferable because there is a tendency that when forming a film by using an aqueous dispersion, the fluorine-containing surfactant precipitates in the film and water absorption increases to make the dispersion turbid in white.

The aqueous dispersion of the VdF seed polymer of the present invention is one in which the VdF seed copolymer is dispersed in water. To the aqueous dispersion can be added a hydrophilic organic solvent.

To the aqueous dispersion of the VdF seed polymer of the present invention can be added various additives to make an aqueous paint. By adding additives which are used generally for aqueous paints, for example, a pigment, thickener, dispersing agent, defoaming agent, anti-freezing agent, auxiliary for film formation and the like, the resulting aqueous dispersion can be used as paints for exterior of buildings and as paints for structures of construction.

Further the present invention relates to a process for preparing an aqueous dispersion of a VdF seed polymer by emulsion polymerization of an ethylenically unsaturated monomer in the presence of VdF copolymer particles.

In order to obtain the above-mentioned VdF copolymer, VdF monomer may be emulsion-polymerized with a reactive emulsifying agent. The reactive emulsifying agent is a fluorine-containing compound having a copolymerizable double bond and a hydrophilic group in its molecule and is at least one compound selected from the group consisting of those represented by the above-mentioned formula (I):

(I)

wherein a is an integer of 1 to 10, Y is $SO_3M$ or COOM (M is H, $NH_4$ or an alkali metal), the formula (II):

(II)

wherein X is F or $CF_3$, b is an integer of 1 to 5, Y is $SO_3M$ or COOM (M is H, $NH_4$ or an alkali metal), the formula (III):

$$CF_2=CF-O-(CFX)_c-Y \quad (III)$$

wherein X is F or $CF_3$, c is an integer of 1 to 10, Y is $SO_3M$ or COOM (M is H, $NH_4$ or an alkali metal), the formula (IV):

$$CF_2=CF-O-(CF_2CFXO)_d-CF_2CF_2-Y \quad (IV)$$

wherein X is F or $CF_3$, d is an integer of 1 to 10, Y is $SO_3M$ or COOM (M is H, $NH_4$ or an alkali metal), the formula (V):

$$CH_2=CFCF_2-O-(CF(CF_3)CF_2O)_e-CF(CF_3)-Y \quad (V)$$

wherein e is 0 or an integer of 1 to 10, Y is $SO_3M$ or COOM (M is H, $NH_4$ or an alkali metal), and the formula (VI):

$$CF_2=CFCF_2-O-(CF(CF_3)CF_2O)_f-CF(CF_3)-Y \quad (VI)$$

wherein f is an integer of 1 to 10, Y is $SO_3M$ or COOM (M is H, $NH_4$ or an alkali metal).

In the above-mentioned formula (I), it is preferable that a is an integer of 1 to 5 from the viewpoint of surface activating ability of the reactive emulsifying agent, that Y is COOM from the viewpoint of stability of the compound and that M is H or $NH_4$ from the viewpoint of water resistance of a coating film.

Examples of the compound represented by the above-mentioned formula (I) are, for instance, $CF_2=CF-CF_2-COONH_4$, $CF_2=CF-CF_2-COOH$, $CF_2=CF-CF_2CF_2COOH$, $CF_2=CF-CF_2-COONa$, $CF_2=CF-CF_2-SO_3NH_4$, $CF_2=CF-CF_2-SO_3H$, $CF_2=CF-CF_2CF_2SO_3H$, $CF_2=CF-CF_2CF_2SO_3Na$ and the like. $CF_2=CFCF_2COONH_4$ is preferable from the viewpoint that an aqueous dispersion of a VdF copolymer having a small particle size can be obtained at a high concentration.

In the above-mentioned formula (II), it is preferable that X is $CF_3$ from the viewpoint of stability of the compound, that b is an integer of 1 to 3 from the viewpoint of surface activating ability of the reactive emulsifying agent, that Y is COOM or $SO_3M$ from the viewpoint of stability of the compound and that M is H or $NH_4$ from the viewpoint of water resistance of a coating film.

Examples of the compound represented by the above-mentioned formula (II) are, for instance, $$CF_2=CFCF_2\overset{\overset{\displaystyle CF_3}{|}}{CF}-COOH,$$

$$CF_2=CFCF_2\overset{\overset{\displaystyle CF_3}{|}}{CF}-SO_3H,$$

$$CF_2=CF(CF_2\overset{\overset{\displaystyle CF_3}{|}}{CF})_2COONH_4,$$

$$CF_2=CFCF_2\overset{\overset{\displaystyle CF_3}{|}}{CF}SO_3NH_4,$$

$$CF_2=CFCF_2\overset{\overset{\displaystyle CF_3}{|}}{CF}-COONa,$$

$$CF_2=CFCF_2\overset{\overset{\displaystyle CF_3}{|}}{CF}-SO_3Na,$$

$$CF_2=CF(CF_2\overset{\overset{\displaystyle CF_3}{|}}{CF})_2COOH$$

and the like. From the viewpoint that an aqueous dispersion of a VdF copolymer having a small particle size can be obtained, $$CF_2=CF(CF_2\overset{\overset{\displaystyle CF_3}{|}}{CF})_2COOH$$

is preferable.

In the above-mentioned formula (III), it is preferable that X is F or $CF_3$ from the viewpoint of stability of the compound and weather resistance, that c is an integer of 1 to 5 from the viewpoint of surface activating ability of the reactive emulsifying agent, that Y is COOM or $SO_3M$ from the viewpoint of stability of the compound and that M is H or $NH_4$ from the viewpoint of water resistance of a coating film.

Examples of the compound represented by the above-mentioned formula (III) are, for instance, $CF_2=CF-OCF_2CF_2CF_2COOH$, $CF_2=CF-OCF_2CF_2COONH_4$, $CF_2=CF-OCF_2COOH$ and the like. $CF_2=CF-OCF_2CF_2CF_2COOH$ is preferable from the viewpoint that an aqueous dispersion of a VdF copolymer having a small particle size can be obtained.

In the above-mentioned formula (IV), it is preferable that X is F or $CF_3$ from the viewpoint of stability of the compound and weather resistance, that d is an integer of 1 to 5 from the viewpoint of surface activating ability of the reactive emulsifying agent, that Y is COOM or $SO_3M$ from the viewpoint of stability of the compound and that M is H or $NH_4$ from the viewpoint of water resistance of a coating film.

Examples of the compound represented by the above-mentioned formula (IV) are, for instance, $CF_2=CF-O-CF_2CF(CF_3)-OCF_2CF_2-COOH$, $CF_2=CF-O-CF_2CF(CF_3)-OCF_2CF_2-COONH_4$, $CF_2=CF-O-CF_2CF(CF_3)-OCF_2CF_2SO_3H$, $CF_2=CF-O-CF_2CF(CF_3)-OCF_2CF_2SO_3NH_4$ and the like. From a point that an aqueous dispersion of a VdF copolymer having a small particle size can be obtained, $CF_2=CF-O-CF_2CF(CF_3)-OCF_2CF_2-COOH$ and $CF_2=CF-O-CF_2CF(CF_3)-OCF_2CF_2-SO_3H$ are preferable.

In the above-mentioned formula (V), it is preferable that e is an integer of 1 to 5 from the viewpoint of surface activating ability of the reactive emulsifying agent, that Y is COOM from the viewpoint of stability of the compound and that M is Na or $NH_4$ from the viewpoint of water resistance of a coating film.

Examples of the compound represented by the above-mentioned formula (V) are, for instance, $$CH_2=CFCF_2O\overset{\overset{\displaystyle CF_3}{|}}{CF}COONa,$$

$$CH_2=CFCF_2O\overset{\overset{\displaystyle CF_3}{|}}{CF}CF_2O\overset{\overset{\displaystyle CF_3}{|}}{CF}COONa,$$

$$CH_2=CFCF_2O(\overset{\overset{\displaystyle CF_3}{|}}{CF}CF_2O)_2\overset{\overset{\displaystyle CF_3}{|}}{CF}COONa,$$

$$CH_2=CFCF_2O\overset{\overset{\displaystyle CF_3}{|}}{CF}COONH_4,$$

$$CH_2=CFCF_2O\overset{\overset{\displaystyle CF_3}{|}}{CF}CF_2O\overset{\overset{\displaystyle CF_3}{|}}{CF}COONH_4,$$

$$CH_2=CFCF_2O(\overset{\overset{\displaystyle CF_3}{|}}{CF}CF_2O)_2\overset{\overset{\displaystyle CF_3}{|}}{CF}COONH_4$$

and the like. From the viewpoint that an aqueous dispersion of a VdF copolymer having a small particle size can be obtained, $CH_2=CFCF_2OCF(CF_3)COONH_4$ and $CH_2=CFCF_2OCF(CF_3)CF_2OCF(CF_3)COONH_4$ are preferable.

In the above-mentioned formula (VI), it is preferable that f is an integer of 1 to 5 from the viewpoint of surface activating ability of the reactive emulsifying agent, that Y is COOM from the viewpoint of stability of the compound and that M is H or $NH_4$ from the viewpoint of water resistance of a coating film.

Examples of the compound represented by the above-mentioned formula (VI) are, for instance,

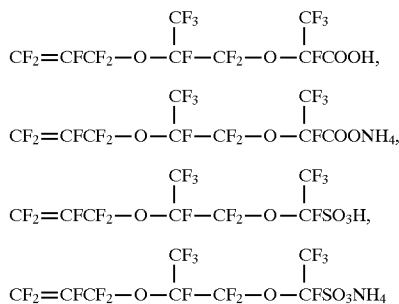

and the like. From the viewpoint that an aqueous dispersion of a VdF copolymer having a small particle size can be obtained,

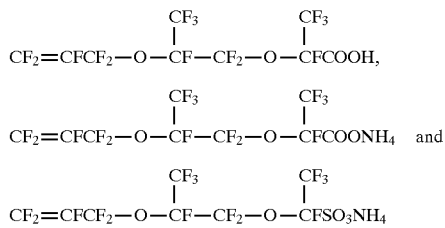

are preferable.

In emulsion-polymerizing the above-mentioned VdF monomer with the above-mentioned reactive emulsifying agent, a fluorine-containing monomer other than VdF can be used. Examples of the other fluorine-containing monomer, are, for instance, tetrafluoroethylene (TFE), trifluoroethylene (TrFE), chlorotrifluoroethylene (CTFE), hexafluoropropylene (HFP), vinyl fluoride (VF) and the like. From the viewpoint of copolymerizability of the VdF monomer, TFE, HFP and CTFE are preferable.

In the above-mentioned emulsion polymerization, a known fluorine-containing surfactant can be used.

The known fluorine-containing surfactant is one or a mixture of compounds having surface activating ability and containing fluorine atom in the structure. For example, there are an acid represented by $X(CF_2)_n COOH$ (X is F or H, n is an integer of 6 to 20), its alkali metal salt, ammonium salt, amine salt or quaternary ammonium salt; an acid represented by $Y(CH_2CF_2)_m COOH$ (Y is F or Cl, m is an integer of 6 to 13), its alkali metal salt, ammonium salt, amine salt or quaternary ammonium salt; and the like. From weather resistance and water resistance points of view, ammonium salt of perfluorooctanoic acid and ammonium salt of perfluorononanoic acid are preferable.

An amount of the above-mentioned fluorine-containing surfactant is not more than 1.0%, preferably not more than 0.5%, more preferably not more than 0.2% on the basis of water. When the amount of the fluorine-containing surfactant is more than 1.0%, it is not preferable because there is a tendency that when forming a film by using an aqueous dispersion, the fluorine-containing surfactant precipitates in the film and water absorption increases to make the dispersion turbid in white.

In order to prepare the above-mentioned aqueous dispersion of the VdF seed polymer, a reactor is charged with water as a polymerization solvent and the above-mentioned reactive emulsifying agent in an amount of 0.00001 to 10%, preferably 0.0001 to 1.0%, more preferably 0.001 to 0.5% on the basis of the polymerization solvent, and then pressure feeding of nitrogen gas and deaeration are repeated to remove dissolved air.

When the amount of the above-mentioned reactive emulsifying agent charged is less than 0.00001%, there is a tendency that large particles having insufficient stability against sedimentation are obtained. When more than 10%, there is a tendency that shape of the particles does not become spherical and film forming property when drying the aqueous dispersion is lowered.

Then the above-mentioned VdF monomer alone or a monomer mixture comprising the VdF monomer and the other fluorine-containing monomer is fed into the reactor under pressure to be a pressure of 1.0 to 50 $kgf/cm^2$.

In that case, a mixing ratio of the other fluorine-containing monomer may be from 0 to 30% by mole.

Then as a polymerization initiator, for example, a persulfate such as ammonium persulfate, hydrogen peroxide, di-isopropyl peroxydicarbonate or azobisisobutyronitrile is introduced in an amount of 0.0001 to 0.5%, preferably 0.001 to 0.1% on the basis of water. When the amount of the polymerization initiator is less than 0.0001%, polymerization speed which can be used practically tends not to be obtainable. When more than 0.5%, controlling of reaction heat tends to become difficult.

Further the above-mentioned VdF monomer or monomer mixture is supplied continuously so that the pressure in the reactor becomes constant in the range of 1 to 50 $kgf/cm^2$, preferably 5 to 40 $kgf/cm^2$. When the pressure is less than 1 $kgf/cm^2$, practical polymerization speed tends not to be obtainable. When more than 50 $kgf/cm^2$, controlling of reaction heat tends to become difficult.

Polymerization is carried out for 5 to 100 hours under the conditions mentioned above.

After that, the inside conditions of the reactor are returned to normal temperature and normal pressure and then the polymerization is terminated to give an aqueous dispersion of the VdF copolymer.

Then to the above-mentioned aqueous dispersion of the VdF copolymer is added 20 to 100 parts by weight, preferably 30 to 100 parts by weight, more preferably 40 to 100 parts by weight of the above-mentioned ethylenically unsaturated monomer on the basis of 100 parts by weight of the VdF copolymer.

When an amount of the above-mentioned ethylenically unsaturated monomer is less than 20 parts by weight, transparency and gloss of a coating film tend to be lowered.

Further immediately after that, as a polymerization initiator, for example, a persulfate such as ammonium persulfate is added in an amount of 0.05 to 2.0 parts by weight on the basis of 100 parts by weight of the above-mentioned ethylenically unsaturated monomer and polymerization is initiated. The polymerization is carried out at a temperature of 20° to 90° C. for 0.5 to 6 hours, followed by adjusting pH with an alkaline solution and then filtrating with a metal net to obtain an aqueous dispersion of the VdF seed polymer.

An average particle size of the VdF seed polymer of the aqueous dispersion obtained by the above-mentioned process can be controlled within not more than 250 nm. The average particle size can be controlled by the amount of the reactive emulsifying agent.

Also the content of the VdF seed polymer in the aqueous dispersion of the VdF seed polymer which is prepared by the above-mentioned process can be controlled within 30 to 60%. The content can be controlled by blowing the VdF monomer or the monomer mixture out from the reactor at the time when a given amount thereof has been fed continuously, and then stopping stirring to terminate the reaction.

The present invention is then explained by referring to Examples, but is not limited thereto.

The numbers and structural formulae of the reactive emulsifying agents used in Examples and Comparative Examples are shown in Table 1.

TABLE 1

| No. of reactive emulsifying agent | structural formula of reactive emulsifying agent |
|---|---|
| 1 | $CF_2=CFCF_2-COOH$ |
| 2 | $CF_2=CF-O-CF_2CF_2CF_2-COOH$ |
| 3 | $CF_2=CF-O-CF_2CF(CF_3)-OCF_2CF_2-COOH$ |
| 4 | $CF_2=CF-O-CF_2CF(CF_3)-OCF_2CF_2-SO_3H$ |
| 5 | $CH_2=CFCF_2-O-CF(CF_3)(CF_2O-CF(CF_3)-COOH$ |
| 6 | $CH_2=CFCF_2-O-CF(CF_3)-COOH$ |
| 7 | $CF_2=CFCF_2-O-CF(CF_3)CF_2-O-CF(CF_3)-COOH$ |

EXAMPLE 1

A one-liter pressure resistive reactor equipped with a stirrer was charged with 500 ml of deionized water and 5.0 g of a reactive emulsifying agent (No. 1) shown in Table 1 and then introduction of a pressurized nitrogen gas and deaeration were repeated to remove the dissolved air. A monomer mixture of VdF (80% by mole) and TFE (20% by mole) was pressure-fed until the inside pressure of the reactor became 10 kgf/cm$^2$ at 60° C. Then 0.2 g of ammonium persulfate was added, the monomer mixture was continuously supplied to maintain the inside pressure of the reactor constant at 10 kgf/cm$^2$, and the reaction was carried out for 20 hours. Afterwards the inside conditions of the reactor were returned to normal temperature and normal pressure to terminate the polymerization and give an aqueous dispersion of a VdF polymer of the present invention, and the following tests were carried out.

The tests were carried out in the following manner.

Solid content

The aqueous dispersion was dried at 150° C. for one hour in a vacuum dryer. The ratio of a weight after drying to a weight before drying of the aqueous dispersion is shown by percentage.

Average particle size

Measured by a laser beam scattering particle size measuring device (tradename ELS-3000 available from Otsuka Denshi Kabushiki Kaisha).

Particle size distribution

Particle size was measured with a laser beam scattering particle size measuring device (tradename ELS-3000 available from Otsuka Denshi Kabushiki Kaisha), and a ratio of a weight average particle size dw to a number average particle size dn (dw/dn) was assumed to be particle size distribution.

Stability against sedimentation

The aqueous dispersion was allowed to stand at 25° C. for 60 days and then evaluated as follows:

The aqueous dispersion when checked with naked eyes was evaluated to be "○" where there was no change in dispersed state, to be "Δ" when sedimentation of particles and phase separation occurred but re-dispersing procedure was possible by shaking, and to be "X" when sedimentation of particles and phase separation occurred and re-dispersing procedure could not be done even by shaking.

The results are shown in Table 2.

EXAMPLES 2 TO 13

The aqueous dispersion of the VdF copolymer of the present invention was obtained in the same manner as in Example 1 except that the polymerization conditions shown in Table 2 were employed. The same tests as in Example 1 were carried out. The results are shown in Table 2.

Comparative Examples 1 to 6

An aqueous dispersion of a VdF copolymer or an aqueous dispersion of a tetrafluoroethylene-propylene copolymer was obtained in the same manner as in Example 1 except that the polymerization conditions shown in Table 2 were employed. The same tests as in Example 1 were carried out. The results are shown in Table 2.

TABLE 2

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Polymerization conditions | | | | | | | | | | |
| Monomers supplied (% by mole) | | | | | | | | | | |
| VdF[1] | 80 | 80 | 80 | 80 | 100 | 80 | 75 | 72 | 75 | 75 |
| TFE[1] | 20 | 20 | 20 | 20 | — | 20 | 15 | 20 | 15 | 15 |
| CTFE[1] | — | — | — | — | — | — | 10 | — | 10 | 10 |
| HFP[1] | — | — | — | — | — | — | — | 8 | — | — |
| P[1] | — | — | — | — | — | — | — | — | — | — |
| No. of reactive emulsifying agent | 1 | 2 | 3 | 4 | 5 | 5 | 5 | 5 | 5 | 5 |
| Added amount based on water (% by weight) | 1.0 | 0.1 | 0.1 | 0.1 | 0.1 | 0.1 | 0.1 | 0.1 | 0.5 | 0.01 |
| Added amount of ammonium salt of perfluorooctanoic acid based on water (% by weight) | — | — | — | — | — | — | — | — | — | — |
| Polymerization pressure (kgf/cm$^2$ G) | 10 | 10 | 10 | 10 | 20 | 10 | 8 | 8 | 8 | 8 |
| Polymerization time (hr) | 20 | 27 | 25 | 23 | 36 | 24 | 25 | 21 | 30 | 50 |
| Tests | | | | | | | | | | |
| Solid content (% by weight) | 31.0 | 30.5 | 31.2 | 30.3 | 30.2 | 30.6 | 37.4 | 34.3 | 39.9 | 35.0 |
| Average particle size (nm) | 178.1 | 162.3 | 173.1 | 154.7 | 131.4 | 120.0 | 116.2 | 105.8 | 100.4 | 156.4 |

TABLE 2-continued

| | | | | | | | | | |
|---|---|---|---|---|---|---|---|---|---|
| Particle size distribution (dw/dn) | 1.27 | 1.54 | 1.48 | 1.55 | 1.38 | 1.38 | 1.56 | 1.43 | 1.45 | 1.59 |
| Stability against sedimentation | ○ | ○ | ○ | ○ | ○ | ○ | ○ | ○ | ○ | ○ |

| | Ex. 11 | Ex. 12 | Ex. 13 | Com. Ex. 1 | Com. Ex. 2 | Com. Ex. 3 | Com. Ex. 4 | Com. Ex. 5 | Com. Ex. 6 |
|---|---|---|---|---|---|---|---|---|---|
| Polymerization conditions | | | | | | | | | |
| Monomers supplied (% by mole) | | | | | | | | | |
| VdF[1] | 80 | 75 | 75 | 80 | 75 | 72 | 75 | 40 | — |
| TFE[1] | 20 | 15 | 15 | 20 | 15 | 20 | 15 | 60 | 50 |
| CTFE[1] | — | 10 | 10 | — | 10 | — | 10 | — | — |
| HFP[1] | — | — | — | — | — | 8 | — | — | — |
| P[1] | — | — | — | — | — | — | — | — | 50 |
| No. of reactive emulsifying agent | 7 | 6 | 5 | — | — | — | — | 5 | 5 |
| Added amount based on water (% by weight) | 0.1 | 0.5 | 0.5 | — | — | — | — | 1.0 | 1.0 |
| Added amount of ammonium salt of perfluorooctanoic acid based on water (% by weight) | — | — | 0.1 | 1.0 | 0.5 | 0.1 | 2.0 | — | — |
| Polymerization pressure (kgf/cm² G) | 10 | 8 | 8 | 10 | 8 | 8 | 8 | 8 | 10 |
| Polymerization time (hr) | 26 | 25 | 26 | 20 | 23 | 21 | 16 | 13 | 68 |
| Tests | | | | | | | | | |
| Solid content (% by weight) | 31.6 | 32.0 | 41.9 | 24.6 | 34.6 | 32.0 | 38.8 | 21.1 | 30.1 |
| Average particle size (nm) | 131.3 | 49.2 | 104.3 | 269.2 | 221.6 | 234.5 | 68.5 | 216.0 | 231.6 |
| Particle size distibution (dw/dn) | 1.27 | 1.39 | 1.02 | 1.08 | 1.05 | 1.03 | 1.12 | 2.04 | 1.51 |
| Stability against sedimentation | ○ | ○ | ○ | X | X | X | Δ | X | Δ |

[1])VdF: Vinylidene fluoride, TFE: Tetrafluoroethylene, CTFE: Chlorotrifluoroethylene, HFP: Hexafluoropropylene, P: Propylene

EXAMPLE 14

A 200 ml four-necked flask equipped with a stirrer, cooling tube and thermometer was charged with 70 g of the aqueous dispersion of the VdF copolymer prepared in Example 7, and thereto was added an alkali salt of alkylallylsulfosuccinate (available from Sanyo Kasei Kogyo Kabushiki Kaisha, tradename: ELEMINOL JS2) in an amount of 0.5% on the basis of the solid resin as a polymerizable emulsifying agent for securing stability of seed particles in seed polymerization, followed by heating in a water bath with stirring. When the inside temperature of the flask reached 80° C., to the reactor was added dropwise for an hour an emulsion prepared by emulsifying, with the 0.5% aqueous solution of an alkali salt of alkylallylsulfosuccinate, a monomer mixture of 11.2 g of methyl methacrylate (hereinafter referred to as MMA) and 1.5 g of polyoxyethylene methacrylate (available from Nippon Yushi Kabushiki Kaisha, tradename: PME 400, number of moles of ethylene oxide: 9). Immediately after completion of the addition, 1 ml of a 2% aqueous solution of ammonium persulfate was added to initiate the reaction. Three hours after the initiation of the reaction, the inside temperature of the flask was raised to 85° C., and after keeping at that temperature for one hour, then cooled. Then pH was adjusted to 7 with aqueous ammonia, followed by filtration with 300 mesh metal net to give an aqueous dispersion of a VdF seed polymer of the present invention with bluish white color. Then the following tests were carried out.

The tests were carried out in the following manner.
(1) With respect to an aqueous dispersion of a VdF seed polymer Solid content, Average particle size: Tests were carried out in the same manner as in Example 1.

Viscosity: Measurement was made at 25° C. with a B type viscometer.

Minimum film forming temperature (MFT): Minimum temperature at which a continuous film was formed was measured with a thermal gradient tester (available from Rigaku Kogyo Kabushiki Kaisha).
(2) With respect to a film formed by using the above-mentioned aqueous dispersion of the VdF seed polymer Transparency: An aqueous dispersion was poured in a 10 cm diameter petri dish so that a dried film thickness became 200 μm, and then dried at 80° C. for 24 hours. With respect to the obtained film, transmittance of light having a wavelength of 800 nm was measured and evaluated as follows.

When the film was transparent (when transmittance was not less than 90%), the transparency was evaluated as ○. When semitransparent (when transmittance was from 60 to 90%), the transparency was evaluated as Δ. When turbid in white (when transmittance was not more than 60%), the transparency was evaluated as X.

Water resistance: The film was cut to 2 cm×4 cm and then dipped in hot water of 50° C. for one week. A ratio of increase in weight, which was calculated by the following equation, was assumed to be a water absorption ratio.

$$\text{Water absorption ratio (\%)} = \frac{(\text{Weight after dipped} - \text{Initial weight})}{\text{Initial weight}} \times 100$$

A ratio of decrease in weight, which was calculated by the following equation after re-drying, was assumed to be an elution ratio.

$$\text{Elution ratio (\%)} = \frac{(\text{Initial weight} - \text{Weight after re-dried})}{\text{Initial weight}} \times 100$$

(3) With respect to a coating obtained from the above-mentioned aqueous dispersion of the VdF seed polymer On the basis of 100 parts by weight of a solid resin contained in the aqueous dispersion obtained in Example 14 were added 50 parts by weight of titanium oxide (available from Ishihara Sangyo Kabushiki Kaisha, tradename: CR90)

as a filler, 2 parts by weight of DISCOAT H-14 (available from Nippon Nyukazai Kabushiki Kaisha) as a dispersing agent, 1 part by weight of ethylene glycol as an antifreezing agent, 0.5 part by weight of FS ANTIFOAM 013B (available from Nippon Nyukazai Kabushiki Kaisha) as a defoaming agent, 0.5 part by weight of SN THICKENER A-818 (available from Sunnopco Kabushiki Kaisha) as a thickener and 10 parts by weight of TEXANOL CS12 (available from Chisso Kabushiki Kaisha) as an auxiliary for film formation, followed by mixing sufficiently with a dispersing stirrer to give a paint. Then the following tests were carried out.

Gloss: The obtained paint was applied on a glass plate by means of an applicator so that the coating thickness after drying was 20 μm. After drying at room temperature for one week, gloss of the coating was measured with a gloss meter (available from Suga Shikenki Kabushiki Kaisha) with an angle of reflection of 60°.

Weather resistance: The obtained paint was applied by means of an airless spray gun on a slate which had been coated with an aqueous epoxy resin sealer EM-0150 (available from Sanyo Kasei Kogyo Kabushiki Kaisha) so that the coating thickness after drying was 100 μm. The coated slates were dried at room temperature for 24 hours and further at 80° C. for two hours. After those coated slates were allowed to stand in the accelerated weathering machine (SUV) for 1,000 hours, gloss retention ratio was measured and evaluated as follows.

When the gloss retention ratio is not less than 80%, from 60 to 80% and not more than 60%, weather resistance is evaluated as ○, Δ and X, respectively.

Alkali resistance: A coated plate obtained in the same manner as in the weather resistance test was dipped in an aqueous solution of 3% NaOH at 50° C. for one week, and coloration and blister of a coating was judged with naked eyes.

Acid resistance: A coated plate obtained in the same manner as in the weather resistance test was dipped in a 1% acid solution at 50° C. for one week, and coloration and blister of a coating was judged with naked eyes.

The results are shown in Table 3.

EXAMPLES 15 TO 17

An aqueous dispersion of a VdF seed polymer of the present invention was prepared in the same manner as in Example 14 except that the seed polymerization conditions shown in Table 3 were employed, and the same tests as in Example 14 were carried out in the same manner as in Example 14. The results are shown in Table 3.

Comparative Examples 7 and 8

An aqueous dispersion of a VdF seed polymer was prepared in the same manner as in Example 14 except that the seed polymerization conditions shown in Table 3 were employed, and the same tests as in Example 14 were carried out in the same manner as in Example 14. The results are shown in Table 3.

TABLE 3

| Conditions for seed polymerization | | | | | | |
|---|---|---|---|---|---|---|
| Kind of aqueous dispersion used | Aqueous dispersion obtained in Example 7 | Aqueous dispersion obtained in Example 9 | Aqueous dispersion obtained in Example 13 | Aqueous dispersion obtained in Example 12 | Aqueous dispersion obtained in Comparative Example 2 | Aqueous dispersion obtained in Comparative Example 4 |
| Amount used (g) | 70 | 70 | 70 | 70 | 70 | 70 |
| MMA (g) | 11.2 | 12.0 | 12.6 | 9.6 | 10.4 | 11.6 |
| PME 400 (g) | 1.5 | 1.6 | 1.7 | 1.3 | 1.4 | 1.6 |
| Tests | | | | | | |
| Solid content (% by weight) | 42.8 | 45.9 | 47.8 | 38.6 | 41.1 | 44.2 |
| Viscosity (CP) | 56 | 100 | 110 | 68 | 10 | 83 |
| Average particle size (nm) | 136.3 | 120.5 | 126.1 | 60.2 | 277.9 | 87.3 |
| Minimum film forming temperature (°C.) | 43 | 42 | 39 | 36 | 59 | 47 |
| Transparency | ○ | ○ | ○ | ○ | Δ | X |
| Water absorption ratio (%) | 1.8 | 2.3 | 3.2 | 1.5 | 13.7 | 24.6 |
| Elution ratio (%) | 0.5 | 0.3 | 0.3 | 0.2 | 2.6 | 8.3 |
| Gloss (60° G) | 75 | 78 | 76 | 78 | 56 | 32 |
| Weather resistance | ○ | ○ | ○ | ○ | ○ | Δ |
| Acid resistance | Not abnormal | Not abnormal | Not abnormal | Not abnormal | Not abnormal | Not abnormal |
| Alkali resistance | Not abnormal | Not abnormal | Not abnormal | Not abnormal | Slight blister | Blister, coloration |

As is clear from Table 3, when only an ammonium salt of perfluorooctanoic acid which is not reactive is used as an emulsifying agent, if a small amount thereof is used, the particle size becomes large and a highly glossy coating cannot be obtained and if a large amount is used, transparency of the formed film is lowered, and no gloss of the coating is obtained. Also lowering of water resistance and weather resistance of the coating is observed.

On the contrary, when the reactive emulsifying agent is used according to the present invention, not only any of the above-mentioned properties is satisfied but also a coating of a dispersed aqueous composition having a low MFT even in case of the same resin composition can be obtained.

INDUSTRIAL APPLICABILITY

The aqueous dispersion of the VdF copolymer of the present invention is excellent in stability against sedimentation because an average particle size of the VdF copolymer in the dispersion is as small as not more than 200 nm and a solid content in the dispersion is as high as from 30 to 60%.

Also the process for preparation of the aqueous dispersion of the VdF copolymer of the present invention can provide the above-mentioned dispersion by copolymerizing VdF monomer with the reactive emulsifying agent, in which the dispersion is excellent in stability against sedimentation because an average particle size of the VdF copolymer is as small as not more than 200 nm and a solid content of the dispersion is as high as from 30 to 60%.

Further the aqueous dispersion of the VdF seed polymer of the present invention is excellent in stability against sedimentation because an average particle size of the VdF seed polymer in the dispersion is as small as not more than 250 nm and a solid content of the dispersion is as high as from 30 to 60%. A film obtained from the dispersion has excellent transparency and good water resistance, and also an aqueous paint obtained from the dispersion is highly glossy and is excellent in weather resistance, acid resistance and alkali resistance.

Further the process for preparation of the aqueous dispersion of the VdF seed polymer of the present invention can provide the above-mentioned dispersion prepared by seed-polymerizing an ethylenically unsaturated monomer in the presence of the VdF copolymer particles obtained by copolymerizing VdF monomer with the reactive emulsifying agent, in which the dispersion is excellent in stability against sedimentation because an average particle size of the VdF seed polymer in the dispersion is as small as not more than 250 nm and a solid content of the dispersion is as high as from 30 to 60%.

We claim:

1. An aqueous dispersion of a vinylidene fluoride copolymer, characterized in that the dispersion has a solid content of 30 to 60% by weight and an average particle size of the copolymer of not more than 200 nm; the copolymer being prepared by copolymerizing vinylidene fluoride monomer with at least one reactive emulsifying agent selected from the group consisting of those represented by the formula (I):

   (I)

wherein a is an integer of 1 to 10, Y is SO$_3$M or COOM (M is H, NH$_4$ or an alkali metal), the formula (II):

   (II)

wherein X is F or CF$_3$, b is an integer of 1 to 5, Y is SO$_3$M or COOM (M is H, NH$_4$ or an alkali metal), the formula (III):

   (III)

wherein X is F or CF$_3$, c is an integer of 1 to 10, Y is SO$_3$M or COOM (M is H, NH$_4$ or an alkali metal), the formula (IV):

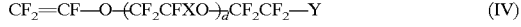   (IV)

wherein X is F or CF$_3$, d is an integer of 1 to 10, Y is SO$_3$M or COOM (M is H, NH$_4$ or an alkali metal), the formula (V):

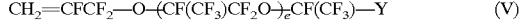   (V)

wherein e is 0 or an integer of 1 to 10, Y is SO$_3$M or COOM (M is H, NH$_4$ or an alkali metal), and the formula (VI):

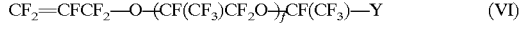   (VI)

wherein f is an integer of 1 to 10, Y is SO$_3$M or COOM (M is H, NH$_4$ or an alkali metal).

2. A process for preparing an aqueous dispersion of a vinylidene fluoride copolymer, characterized in that, when preparing the aqueous dispersion of the vinylidene fluoride copolymer by emulsion-polymerizing vinylidene fluoride monomer with a reactive emulsifying agent, 0.00001 to 10% by weight, on the basis of water, of at least one reactive emulsifying agent selected from the group consisting of those represented by the formula (I):

   (I)

wherein a is an integer of 1 to 10, Y is SO$_3$M or COOM (M is H, NH$_4$ or an alkali metal), the formula (II):

   (II)

wherein X is F or CF$_3$, b is an integer of 1 to 5, Y is SO$_3$M or COOM (M is H, NH$_4$ or an alkali metal), the formula (III):

   (III)

wherein X is F or CF$_3$, c is an integer of 1 to 10, Y is SO$_3$M or COOM (M is H, NH$_4$ or an alkali metal), the formula (IV):

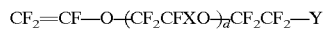

wherein X is F or CF$_3$, d is an integer of 1 to 10, Y is SO$_3$M or COOM (M is H, NH$_4$ or an alkali metal), the formula (V):

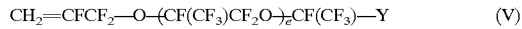   (V)

wherein e is 0 or an integer of 1 to 10, Y is SO$_3$M or COOM (M is H, NH$_4$ or an alkali metal), and the formula (VI):

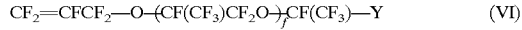   (VI)

wherein f is an integer of 1 to 10, Y is SO$_3$M or COOM (M is H, NH$_4$ or an alkali metal) is used, and that the solid content of the aqueous dispersion is adjusted to 30 to 60% by weight and the average particle size of the copolymer is adjusted to not more than 200 nm.

3. An aqueous dispersion of a vinylidene fluoride seed polymer prepared by emulsion-polymerizing an ethylenically unsaturated monomer in the presence of vinylidene fluoride copolymer particles, characterized in that the vinylidene fluoride copolymer is a copolymer prepared by copolymerizing vinylidene fluoride monomer with at least one reactive emulsifying agent selected from the group consisting of those represented by the formula (I):

   (I)

wherein a is an integer of 1 to 10, Y is SO$_3$M or COOM (M is H, NH$_4$ or an alkali metal), the formula (II):

   (II)

wherein X is F or CF$_3$, b is an integer of 1 to 5, Y is SO$_3$M or COOM (M is H, NH$_4$ or an alkali metal), the formula (III):

   (III)

wherein X is F or CF$_3$, c is an integer of 1 to 10, Y is SO$_3$M or COOM (M is H, NH$_4$ or an alkali metal), the formula (IV):

   (IV)

wherein X is F or CF$_3$, d is an integer of 1 to 10, Y is SO$_3$M or COOM (M is H, NH$_4$ or an alkali metal), the formula (V):

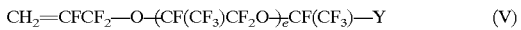

(V)

wherein e is 0 or an integer of 1 to 10, Y is $SO_3M$ or COOM (M is H, $NH_4$ or an alkali metal), and the formula (VI):

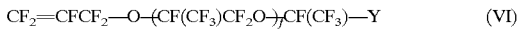

(VI)

wherein f is an integer of 1 to 10, Y is $SO_3M$ or COOM (M is H, $NH_4$ or an alkali metal), and that the dispersion has a solid content of 30 to 60% by weight and an average particle size of the copolymer of not more than 250 nm.

4. A process for preparing an aqueous dispersion of a vinylidene fluoride seed polymer, characterized in that when preparing the aqueous dispersion of the vinylidene fluoride seed polymer by emulsion-polymerizing an ethylenically unsaturated monomer in the presence of vinylidene fluoride copolymer particles, the vinylidene fluoride copolymer is prepared through emulsion polymerization of a vinylidene fluoride monomer with 0.00001 to 10% by weight, on the basis of water, of at least one reactive emulsifying agent selected from the group consisting of those represented by the formula (I):

(I)

wherein a is an integer of 1 to 10, Y is $SO_3M$ or COOM (M is H, $NH_4$ or an alkali metal), the formula (II):

(II)

wherein X is F or $CF_3$, b is an integer of 1 to 5, Y is $SO_3M$ or COOM (M is H, $NH_4$ or an alkali metal), the formula (III):

(III)

wherein X is F or $CF_3$, c is an integer of 1 to 10, Y is $SO_3M$ or COOM (M is H, $NH_4$ or an alkali metal), the formula (IV):

(IV)

wherein X is F or $CF_3$, d is an integer of 1 to 10, Y is $SO_3M$ or COOM (M is H, $NH_4$ or an alkali metal), the formula (V):

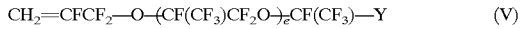

(V)

wherein e is 0 or an integer of 1 to 10, Y is $SO_3M$ or COOM (M is H, $NH_4$ or an alkali metal), and the formula (VI):

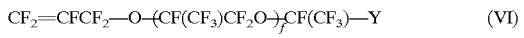

(VI)

wherein f is an integer of 1 to 10, Y is $SO_3M$ or COOM (M is H, $NH_4$ or an alkali metal), and that the solid content of the aqueous dispersion of the seed polymer and an average particle size of the seed polymer are adjusted to 30 to 60% by weight and not more than 250 nm.

5. An aqueous dispersion as in claim 1, wherein the dispersion has a solid content of 35 to 60% by weight.

6. A process as in claim 2, wherein the solid content of the aqueous dispersion is adjusted to 35 to 60% by weight.

7. An aqueous dispersion as in claim 3, wherein the dispersion has a solid content of 35 to 60% by weight.

8. A process as in claim 4, wherein the solid content of the aqueous dispersion is adjusted to 35 to 60% by weight.

* * * * *